United States Patent
Park

(10) Patent No.: US 6,657,985 B1
(45) Date of Patent: Dec. 2, 2003

(54) ORTHOGONAL CODE HOPPING MULTIPLE ACCESS COMMUNICATION SYSTEM

(75) Inventor: Su-Won Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/126,665

(22) Filed: Jul. 30, 1998

(30) Foreign Application Priority Data

Jul. 31, 1997 (KR) .......................................... 97-36679

(51) Int. Cl.$^7$ ................................................ H04B 7/216
(52) U.S. Cl. ..................... 370/342; 370/320; 370/203
(58) Field of Search ............................... 370/342, 343, 370/344, 345, 319, 320, 203, 204, 205, 208, 431, 436; 375/130, 134, 135, 136, 146, 147

(56) References Cited

U.S. PATENT DOCUMENTS

| | | |
|---|---|---|
| 4,460,992 A | 7/1984 | Gutleber |
| 5,267,271 A | 11/1993 | Rice .............................. 375/96 |
| 5,353,352 A | 10/1994 | Dent et al. ..................... 380/37 |
| 5,432,814 A * | 7/1995 | Hasegawa ................... 375/202 |
| 5,459,759 A * | 10/1995 | Schilling |
| 5,528,622 A | 6/1996 | Cadd et al. .................. 375/202 |
| 5,546,429 A | 8/1996 | Chiasson et al. ............ 375/341 |
| 5,586,141 A | 12/1996 | Ashdown et al. ........... 375/202 |
| 5,610,907 A | 3/1997 | Barrett ......................... 370/342 |
| 5,657,343 A | 8/1997 | Schilling ..................... 375/202 |
| 5,675,622 A | 10/1997 | Hewitt et al. .................. 377/33 |
| 5,722,059 A | 2/1998 | Campana, Jr. ............ 455/226.2 |
| 5,742,678 A | 4/1998 | Dent et al. ..................... 380/6 |
| 5,748,669 A | 5/1998 | Yada ............................ 375/202 |
| 5,748,687 A | 5/1998 | Ozluturk ...................... 375/367 |
| 5,771,288 A | 6/1998 | Dent et al. ..................... 380/6 |
| 5,881,094 A * | 3/1999 | Schilling .................... 370/335 |
| 5,887,023 A * | 3/1999 | Mabuchi ..................... 370/204 |
| 6,112,094 A * | 8/2000 | Dent ........................... 455/452 |
| 6,128,328 A * | 10/2000 | Schilling ..................... 375/134 |
| 6,246,713 B1 * | 6/2001 | Mattisson ................... 370/436 |
| 6,246,715 B1 * | 6/2001 | Park ............................ 375/146 |
| 6,327,297 B1 * | 12/2001 | Schilling |

FOREIGN PATENT DOCUMENTS

| | | |
|---|---|---|
| JP | 64-57845 | 3/1989 |
| JP | 6-338873 | 12/1994 |
| JP | 6-350562 | 12/1994 |
| JP | 8-46591 | 2/1996 |
| JP | 9-98154 | 4/1997 |

OTHER PUBLICATIONS

Swedish Office Action dated Sep. 4, 2002 issued in a counterpart application, namely Appln. No. 9802651-1.

* cited by examiner

*Primary Examiner*—Douglas Olms
*Assistant Examiner*—Ricardo M. Pizarro
(74) *Attorney, Agent, or Firm*—Dilworth & Barrese, LLP

(57) ABSTRACT

An orthogonal code hopping multiple access communication system divides channels according to hopping patterns of the orthogonal codes allotted to the respective channels. The communication system includes a transmitter for modulating input digital signals using an orthogonal code hopping multiple access technique and transmitting the modulated digital signals, and a receiver for receiving the digital signals using the orthogonal code hopping multiple access technique and restoring the digital signals.

7 Claims, 7 Drawing Sheets

ORTHOGONAL CODE HOPPING MULTIPLE ACCESS COMMUNICATION SYSTEM

BACKGROUND OF THE INVENTION

1. Field of the Invention

The present invention relates to a CDMA (Code Division Multiple Access) communication system, and more particularly to an orthogonal code hopping multiple access (OCHMA) communication system which divides channels according to the hopping patterns of the orthogonal codes.

2. Description of the Related Art

FIGS. 1A and 1B are block diagrams illustrating the construction of a conventional CDMA communication system using orthogonal codes, wherein FIG. 1A shows a transmitter and FIG. 1B shows a receiver. Here, the orthogonal code may be a Walsh code, a Hadamard code or a Gold code.

Referring to FIG. 1A, an orthogonal code generator (OCG) 10 generates orthogonal codes OC(o)–OC(m) for the respective digital signals Do–Dm output from signal sources 9a–9c. Mixers 11a–11c mix the digital signals Do–Dm with the corresponding orthogonal codes OC(o)–OC(m), and a summer 12 sums the mixed signals output from the mixers 11a–11c. A pseudo-noise sequence generator (PNSG) 13 generates a pseudo-noise sequence (PNS) or a pseudo-random sequence (PRS). A mixer (or multiplier) 14 multiplies an output signal of the summer 12 by the PNS, and a modulator 15 modulates an output signal of the mixer 14 into a RF (Radio Frequency) signal. A power amplifier 16 amplifies the RF signal and transmits the amplified RF signal through an antenna 17.

Referring to FIG. 1B, an RF amplifier 21 amplifies the RF signal received via antenna 20. Demodulator 22 demodulates the RF signal output from the RF amplifier 21 in sync with a sync signal transmitted from the transmitter of FIG. 1A. A mixer (or multiplier) 24 multiplies the demodulated signal output from the demodulator 22 by the PNS generated from an PNSG 23. An orthogonal code generator 28 generates orthogonal codes OC(o)–OC(m) identical to those in the transmitter. Mixers (or multipliers) 25a–25c multiply the output signal of the mixer 24 by the corresponding orthogonal codes OC(o)–OC(m). Integrators 26a–26c integrate the output signals of the mixers 25a–25c to restore the original digital signals Do–Dm and transfer the restored digital signals to the respective signal destinations 27a–27c.

As appreciated from the foregoing, in order to divide the channels, the conventional CDMA communication system allocates the unique orthogonal codes belonging to a specified set of the orthogonal codes to the respective channels and repeatedly multiplies the transmission digital signals by the allocated orthogonal codes. That is, the transmitter of FIG. 1A repeatedly multiplies the allotted orthogonal codes for the bit duration of the digital signal to be transmitted, to spread the digital signal so that the spread digital signal may have wider spectrum than the original digital signal. In addition, the transmitter multiplies the transmission signals by the PNS to scramble the transmission signals so that the other terminals may not restore the scrambled transmission signals. The receiver of FIG. 1B executes a reverse process of the transmitter. That is, the receiver generates the PNS identical to that used in the transmitter and multiplies the received RF signal by the PNS. The receiver then further multiplies the RF signal by the orthogonal codes identical to those used in the transmitter, repeatedly, and integrates the signals for the bit duration of the digital transmission signal, thereby restoring the original digital signals.

As is apparent from the foregoing description, when the digital signals have not been previously encrypted, the conventional CDMA communication system multiplies the digital signals by an agreed PNS between the transmitter and the receiver so as to encrypt the digital signals.

SUMMARY OF THE INVENTION

Accordingly, it is an object of the present invention to provide an orthogonal code hopping multiple access communication system which divides channels in accordance with hopping patterns of orthogonal codes allotted to the respective channels.

To achieve the above object, the CDMA communication system comprises a transmitter for modulating input digital signals using an orthogonal code hopping multiple access technique and transmitting the modulated digital signals, and a receiver for receiving the digital signals using the orthogonal code hopping multiple access technique and restoring the digital signals.

According to an embodiment, the transmitter comprises a first hopping orthogonal code generator for generating orthogonal codes according to a hopping pattern prescribed between the transmitter and the receiver; a plurality of mixers each connected to the first hopping orthogonal code generator, for multiplying the digital signals by the corresponding orthogonal codes; a summer connected to outputs of the mixers, for summing the output signals of the mixers; a modulator for modulating an output signal of the summer; an antenna; and a power amplifier for amplifying an output signal of the modulator and transmitting the amplified signal through the antenna.

The receiver comprises an antenna; a radio frequency (RF) amplifier for amplifying an RF signal received through the antenna; a demodulator for demodulating an output signal of the RF amplifier; a second hopping orthogonal code generator for generating orthogonal codes according to a hopping pattern identical to the hopping pattern in the transmitter; a plurality of mixers for multiplying an output signal of the demodulator by the corresponding orthogonal codes; and a plurality of integrators for integrating output signals of the mixers to restore the digital signals.

The first and second hopping orthogonal code generators each comprising an orthogonal code generator for generating the orthogonal codes according to the hopping pattern; and a hopping controller connected to the orthogonal code generator, for generating the hopping pattern and providing it to the orthogonal code generator.

In an alternative embodiment, each the first and second hopping orthogonal code generators comprise a memory for storing the orthogonal codes, and for outputting the orthogonal codes according to the hopping pattern; and a hopping controller connected to the memory, for generating the hopping pattern and providing it to the memory.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

Figure 1A:
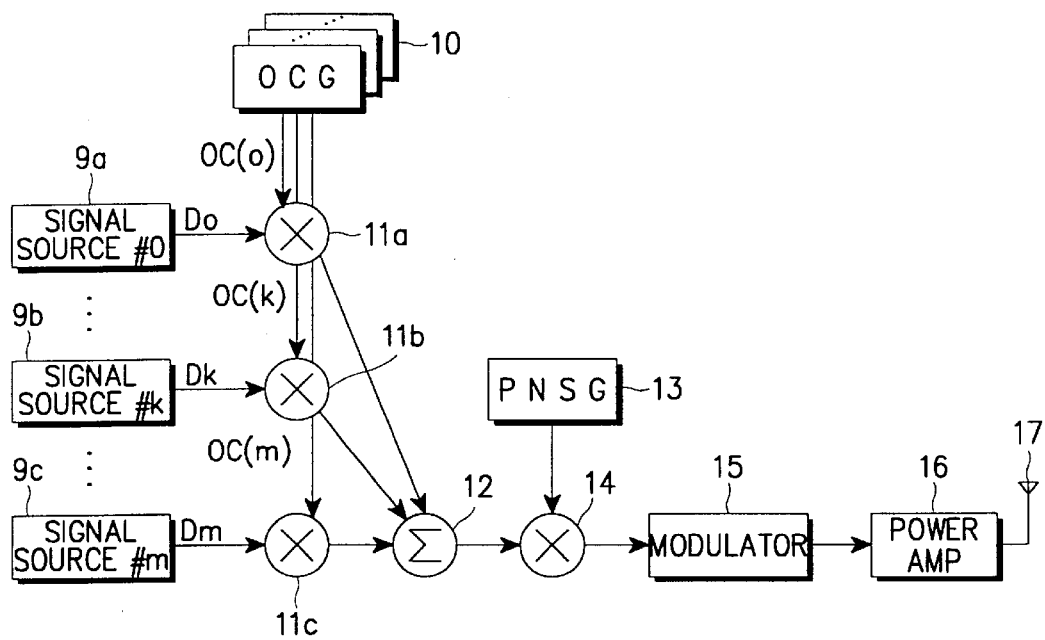
FIGS. 1A and 1B are block diagrams showing the construction of a conventional CDMA communication system using orthogonal codes.
Figure 1B:
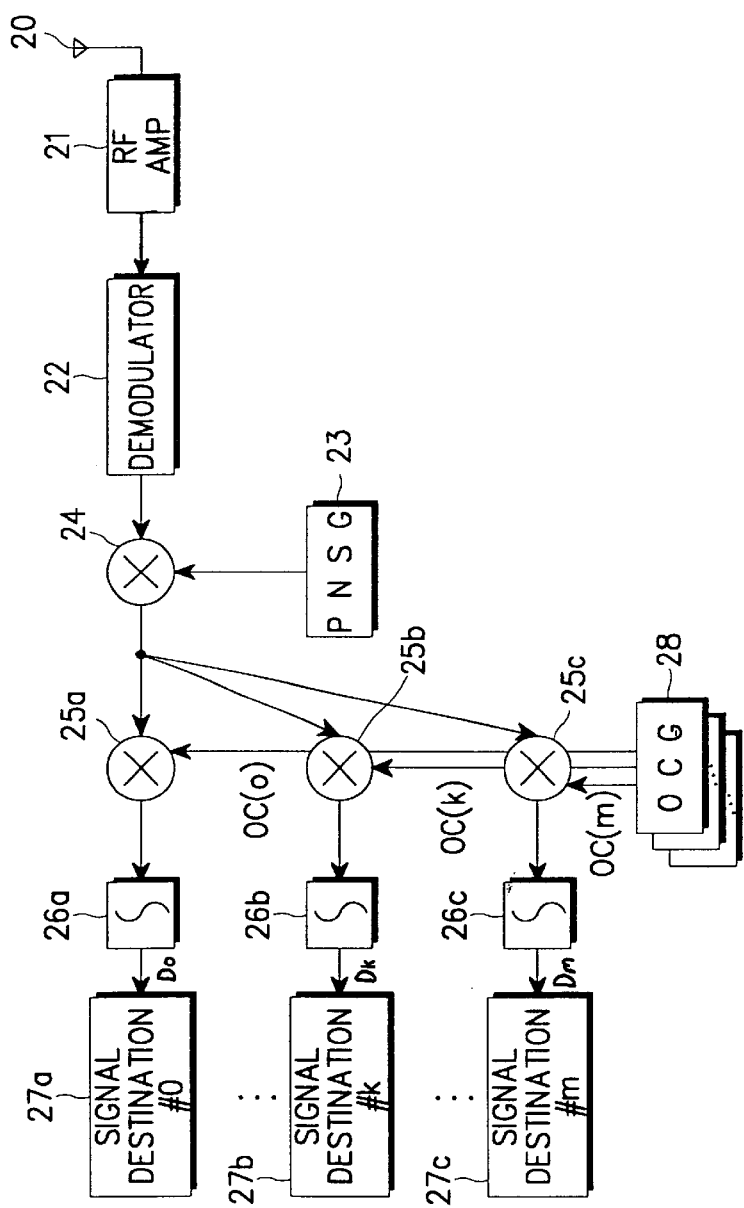

Reference will now be made in detail to preferred embodiments of the present invention. Throughout the drawings, it is noted that the same reference numerals will be used to designate like or equivalent elements having the same function. A detailed description of known functions and constructions necessarily obscuring the subject matter of the present invention has been omitted in the present application for clarity.

Figure 2A:
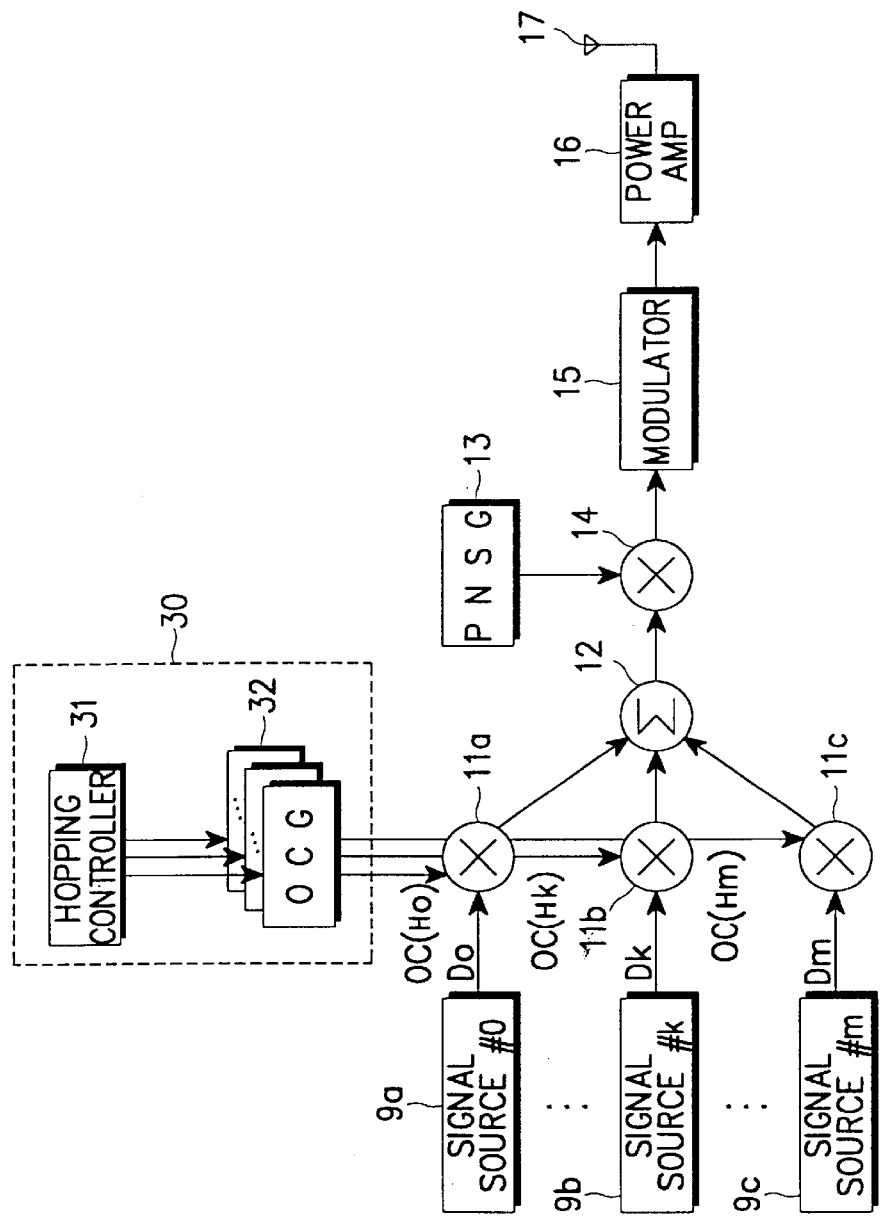
FIGS. 2A and 2B are block diagrams showing the construction of an orthogonal code hopping multiple access communication system according to an embodiment of the present invention.
Figure 2B:
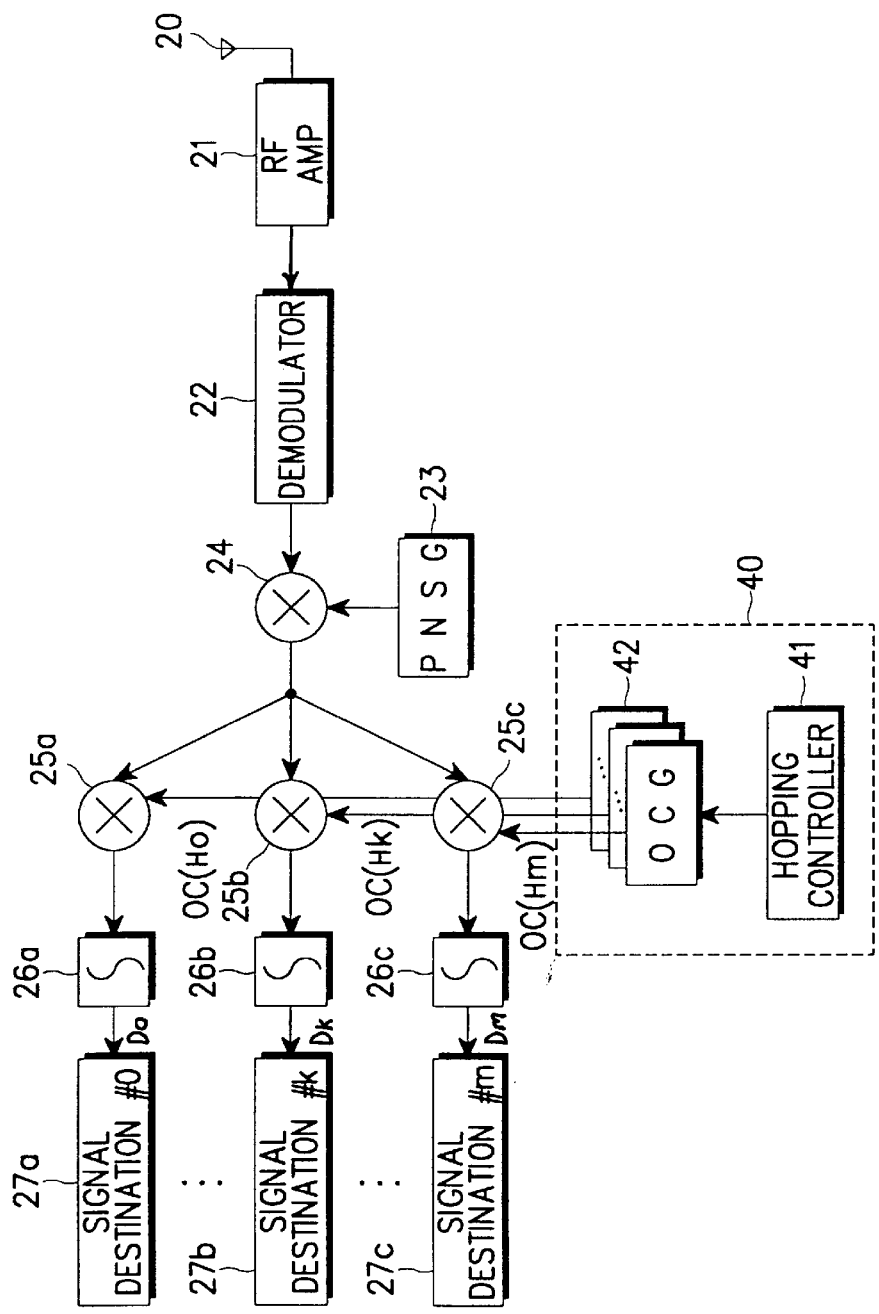

FIGS. 2A and 2B are block diagrams showing the construction of an orthogonal code hopping multiple access (OCHMA) communication system according to an embodiment of the present invention, in which FIG. 2A shows a transmitter and FIG. 2B shows a receiver.

Referring now to FIG. 2A, a hopping orthogonal code generator 30 generates orthogonal codes according to a hopping pattern, and includes a hopping controller 31 for controlling the hopping pattern of the orthogonal codes and an OCG 32 for generating the orthogonal codes according to the hopping pattern controlled by the hopping controller 31. Mixers 11a–11c mix the digital signals Do–Dm output from the signal sources 9a–9c with the corresponding unique orthogonal codes OC(Ho)–OC(Hm) generated according to a specified hopping pattern, and a summer 12 sums the digital output signals of the mixers 11a–11c. A PNSG 13 generates the PNS and a mixer (or multiplier) 14 multiplies the output signal of the summer 12 by the PNS. A modulator 15 modulates an output signal of the mixer 14 into the RF signal, and power amplifier 16 amplifies the RF signal and transmits it through antenna 17.

Referring to FIG. 2B, an RF amplifier 21 amplifies the RF signal received from the transmitter via antenna 20. Demodulator 22 demodulates the amplified RF signal output from the RF amplifier 21. A PNSG 23 generates the PNS identical to that used in the transmitter and mixer 24 multiplies the demodulated signal by the PNS. A hopping orthogonal code generator 40 generates orthogonal codes OC(Ho)–OC(Hm) according to the hopping pattern identical to that used in the transmitter, and includes an orthogonal code generator 42 and a hopping controller 41. Mixers (or multipliers) 25a–25c multiply the signal output from the mixer 24 by the corresponding orthogonal codes OC(Ho) –OC(Hm), respectively. Then, integrators 26a–26c integrate the output signals of the mixers 25a–25c to restore the digital signals Do–Dm and transfer them to the respective signal destinations 27a–27c.

Figure 3A:
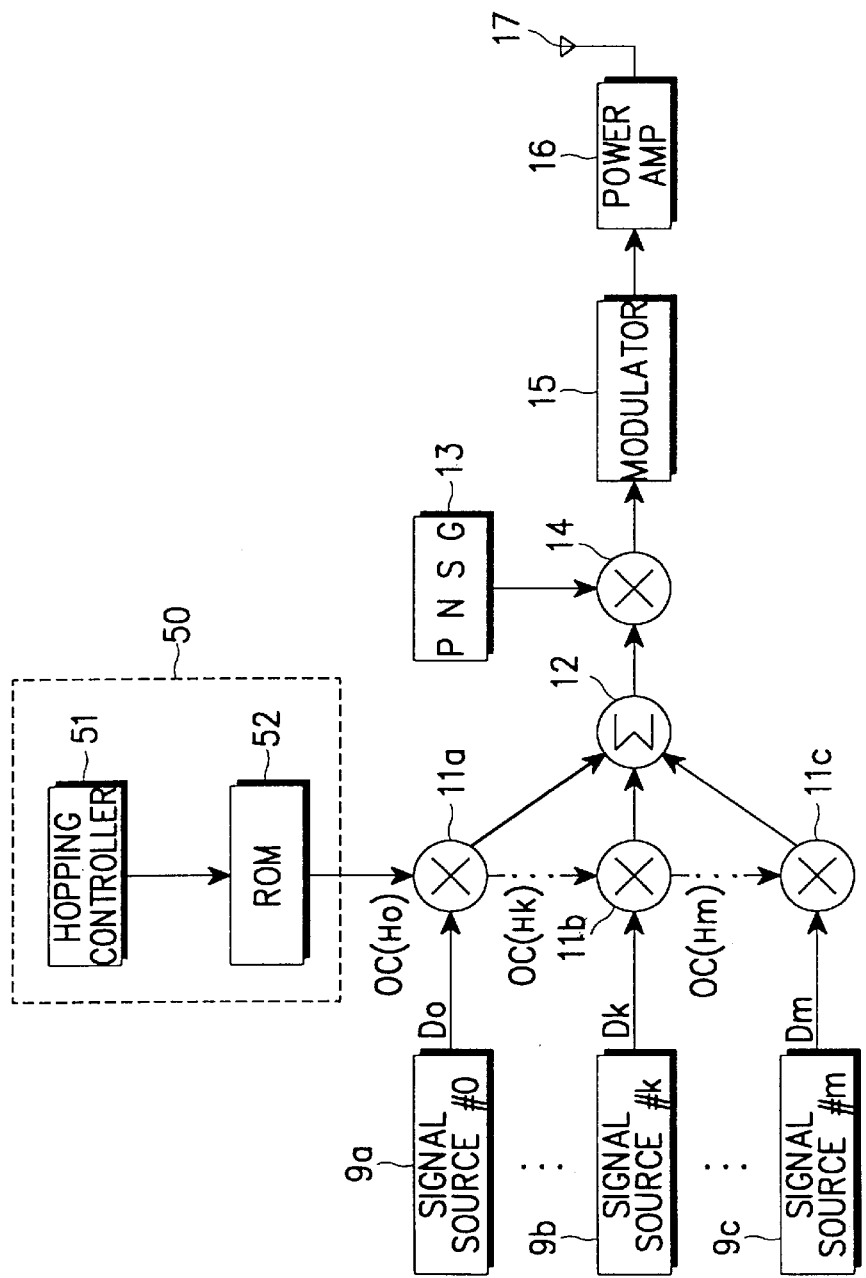
FIGS. 3A and 3B are block diagrams showing the construction of an orthogonal code hopping multiple access communication system according to another embodiment of the present invention.
Figure 3B:
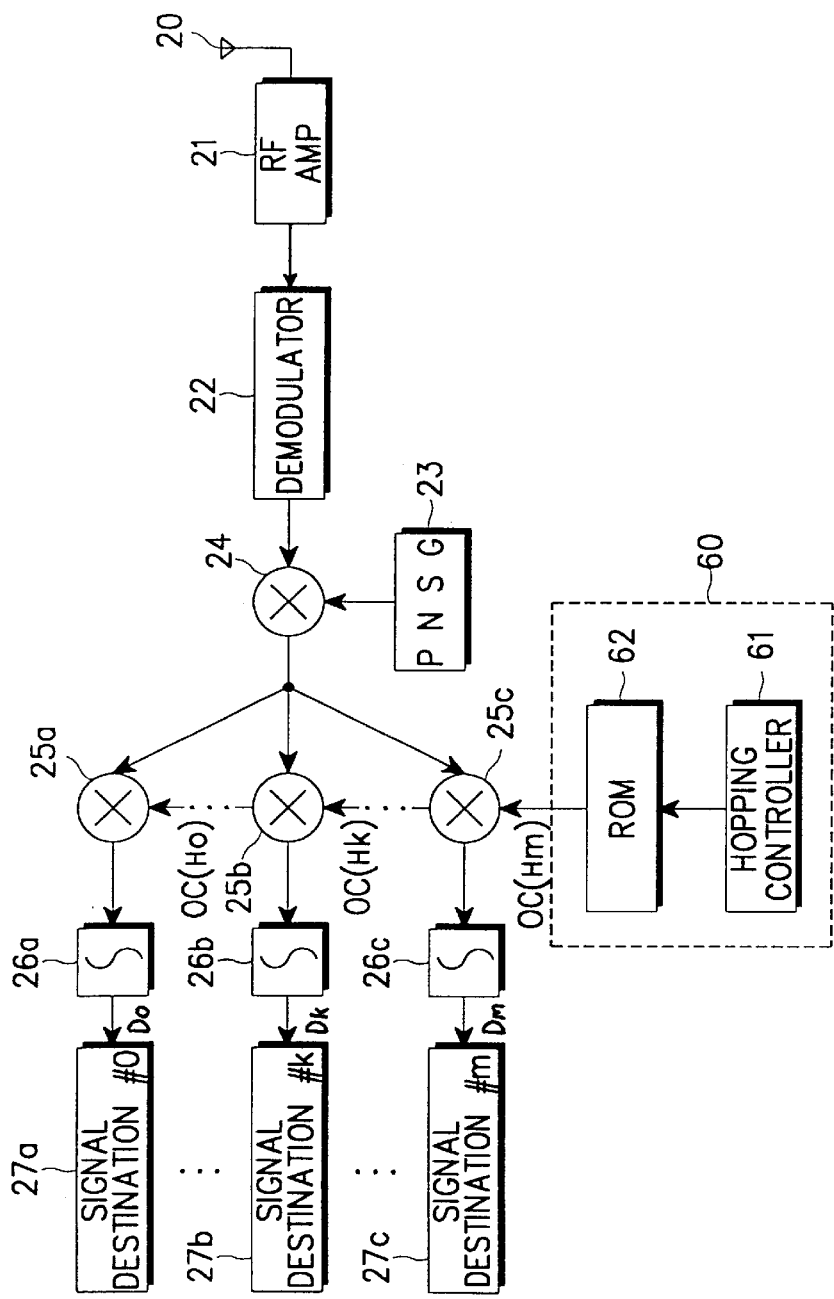

FIGS. 3A and 3B are diagrams illustrating the construction of an OCHMA communication system according to another embodiment of the present invention. It is noted that FIGS. 3A and 3B are identical to the construction of FIGS. 2A and 2B, except for orthogonal code hopping generators 50 and 60. As illustrated, orthogonal code hopping generator 50 comprises a hopping controller 51 for controlling the hopping patterns of the orthogonal codes and a ROM (Read Only Memory) 52 for outputting orthogonal codes stored therein according to the hopping patterns controlled by the hopping controller 51. Similarly, the orthogonal code hopping generator 60 comprises a hopping controller 61 for controlling the hopping pattern of the orthogonal code and a ROM 62 for outputting orthogonal codes stored therein under the control of hopping controller 61.

Figure 4:
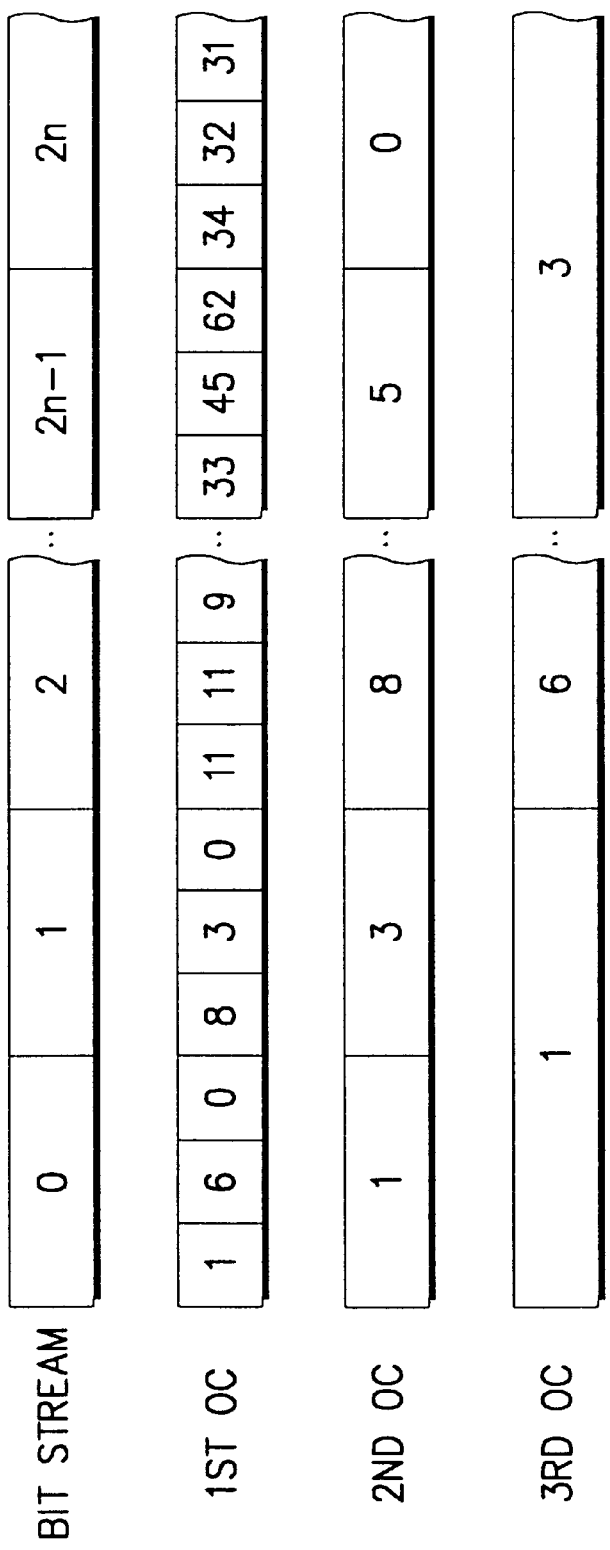
FIG. 4 is a timing diagram showing the hopping patterns of the orthogonal codes according to an embodiment of the present invention.

FIG. 4 is a timing diagram showing the hopping patterns of the orthogonal codes according to an embodiment of the present invention. As illustrated, a first orthogonal code (1ST OC) hops three times for every bit duration so that the orthogonal code may be relatively shorter as compared to the bit duration. A second orthogonal code (2ND OC) has the hopping time identical to the bit duration, and a third orthogonal code (3RD OC) hops every two bit streams so that the hopping time is n times the bit duration (where n is an integer).

As described above, the OCHMA communication system of the invention can uniformly distribute the power density in a certain frequency band as compared with the conventional CDMA communication system, even without multiplying the pseudo-nose sequence, and only the receiver properlperceiving the hopping pattern can restore the digital signals. Thus, the communication system has an encryption function. Furthermore, by multiplying the digital signals by the pseudo-noise sequence, the present invention can reinforce the encryption function and secure more uniform power density.

What is claimed is:

1. A code division multiple access (CDMA) communication system comprising:
a transmitter for modulating input digital signals using an orthogonal code hopping multiple access technique and transmitting the modulated digital signals, said transmitter comprising:
a hopping orthogonal code generator for generating orthogonal codes according to a hopping pattern prescribed between the transmitter and the receiver, wherein said hoping orthogonal code generator comprises an orthogonal code generator for generating the orthogonal codes according to the hopping pattern, and a hopping controller connected to said orthogonal code generator for generating said hopping pattern;
a plurality of mixers each connected to the hopping orthogonal code generator, for multiplying the input digital signals by corresponding orthogonal codes;
a summer connected to outputs of the mixers, for summing output signals of the mixers;
a pseudo noise sequence generator for band-spreading the modulated digital signals;
a modulator for modulating an output signals of the summer;
an antenna; and
a power amplifier for amplifying an output signal of the modulator and transmitting the amplified signal through the antenna; and
a receiver for receiving the digital signals using the orthogonal code hopping multiple access technique and restoring the digital signals.

2. A code division multiple access (CDMA) communication system comprising:
a transmitter for modulating input digital signals using an orthogonal code hopping multiple access technique and transmitting the modulated digital signals, said transmitter comprising:
a hopping orthogonal code generator for generating orthogonal codes according to a hopping pattern prescribed between the transmitter and the receiver, wherein said hopping orthogonal code generator comprises a memory for storing the orthogonal codes for outputting said orthogonal codes according to the hopping pattern, and a hopping controller connected to said memory for generating said hopping pattern;

a plurality of mixers each connected to the hopping orthogonal code generator, for multiplying the input digital signals by corresponding orthogonal codes;

a summer connected to outputs of the mixers, for summing output signals of the mixers;

a pseudo noise sequence generator for band-spreading the modulated digital signals;

a modulator for modulating an output signal of the summer;

an antenna; and a power amplifier for amplifying an output signal of the modulator and transmitting the amplified signal through the antenna; and a receiver for receiving the digital signals using the orthogonal code hopping multiple access technique and restoring the digital signals.

3. A code division multiple access (CDMA) communication system comprising:

a transmitter for modulating input digital signals using an orthogonal code hopping multiple access technique and transmitting the modulated digital signals; and a receiver for receiving the digital signals using the orthogonal code hopping multiple access technique and restoring the digital signals, said receiver comprising:

an antenna;

a radio frequency (RF) amplifier for amplifying an RF signal received through the antenna;

a demodulator for demodulating an output signal of the RF amplifier;

a pseudo noise sequence generator for band-despreading the demodulated digital signals;

a hopping orthogonal code generator for generating orthogonal codes according to a hopping pattern identical to a hopping pattern in the transmitter, wherein said hopping orthogonal code generator comprises an orthogonal code generator for generating the orthogonal codes according to the hopping pattern, and a hopping controller connected to said orthogonal code generator for generating said hopping pattern;

a plurality of mixers for multiplying an output signal of the demodulator by corresponding orthogonal codes, and a plurality of integrators for integrating output signals of the mixers to restore the digital signals.

4. A code division multiple access (CDMA) communication system comprising:

a transmitter for modulating input digital signals using an orthogonal code hopping multiple access technique and transmitting the modulated digital signals; and a receiver for receiving the digital signals using the orthogonal code hopping multiple access technique and restoring the digital signals, said receiver comprising:

an antenna;

a radio frequency (RF) amplifier for amplifying an RF signals received through the antenna;

a demodulator for demodulating an output signal of the RF amplifier;

a pseudo noise sequence generator for band-despreading the demodulated digital signals;

a hopping orthogonal code generator for generating orthogonal codes according to a hoping pattern identical to a hopping pattern in the transmitter, wherein said hopping orthogonal code generator comprises a memory for storing the orthogonal codes and for outputting said orthogonal codes according the hoping pattern, and a hopping controller connected to said memory for generating said hopping pattern;

a plurality of mixers for multiplying an output signal of the demodulator by corresponding orthogonal codes; and a plurality of integrators for integrating output signals of the mixers to restore the digital signals.

5. A code division multiple access (CDMA) communication system having a transmitter for modulating input signals using orthogonal codes and transmitting the modulated signals, and a receiver for receiving the modulated signals and demodulating the received signals using orthogonal codes and restoring the input signals, the system comprising:

orthogonal code hopping means in the transmitter and receiver for generating the orthogonal codes according to a predetermined hopping pattern; and a plurality of mixers for multiplying an output signal of a demodulator by corresponding orthogonal codes, and wherein said orthogonal code hopping means comprises:

an orthogonal code generator for generating the orthogonal codes according to a hoping pattern;

a hopping controller connected to said orthogonal code generator for generating said hopping pattern, and a pseudo noise sequence generator for band-spreading the modulated digital signals.

6. A code division multiple access (CDMA) communication system having a transmitter for modulating input signals using orthogonal codes and transmitting the modulated signals, and a receiver for receiving the modulated signals and demodulating the received signals using orthogonal codes and restoring the input signals, the system comprising:

orthogonal code hopping means in the transmitter and receiver for generating the orthogonal codes according to a predetermined hopping pattern;

a plurality of mixers for multiplying an output signal of a demodulator by corresponding orthogonal codes; and a summer connected to outputs of the plurality of mixers, for summing output signals of the plurality of mixers, wherein said orthogonal code hopping means comprises:

a memory for storing the orthogonal codes and for outputting said orthogonal codes according to the hopping pattern; and a hopping controller connected to said memory for generating said hopping pattern.

7. The CDMA communication system as claimed in claim 6, wherein said memory comprises a Read Only Memory (ROM).

* * * * *